United States Patent [19]

Zelina et al.

[11] Patent Number: 4,785,390
[45] Date of Patent: Nov. 15, 1988

[54] INSTANTANEOUS FAILURE COMPENSATION CIRCUIT

[75] Inventors: Francis J. Zelina, Lake City; Thomas E. Olon, Fairview, both of Pa.

[73] Assignee: American Sterilizer Company, Erie, Pa.

[21] Appl. No.: 33,544

[22] Filed: Apr. 1, 1987

[51] Int. Cl.⁴ ............................................. G05F 1/455
[52] U.S. Cl. ................................. 323/238; 323/321; 323/901; 323/908; 315/91; 315/195
[58] Field of Search ............... 323/238, 239, 246, 320, 323/321, 324, 901, 908; 315/89-91, 195, 205, 294, 297, 324, 325, DIG. 4, DIG. 7

[56] References Cited

U.S. PATENT DOCUMENTS

| | | | |
|---|---|---|---|
| 3,363,143 | 1/1968 | Cavanaugh | 323/238 X |
| 3,723,854 | 3/1973 | Kita | 323/246 |
| 3,898,516 | 8/1975 | Nakasone | 323/238 X |
| 4,258,292 | 3/1981 | Kassfeldt . | |
| 4,295,079 | 10/1981 | Otsuka et al. . | |
| 4,330,778 | 5/1982 | Yamazaki et al. . | |
| 4,392,087 | 7/1983 | Zansky | 363/56 X |
| 4,396,868 | 8/1983 | Watanabe et al. . | |
| 4,451,822 | 5/1984 | Verse et al. . | |

Primary Examiner—Peter S. Wong
Attorney, Agent, or Firm—Kirkpatrick & Lockhart

[57] ABSTRACT

A compensation circuit includes a circuit for monitoring the current delivered to a load and for producing a switching signal whenever a current spike is detected. A control signal representative of the desired voltage across the load is produced. A power supply supplies voltage to the load in response to the control signal. The circuit for generating the control signal is responsive to the switching signal for adjusting the control signal such that when a current spike is detected the voltage delivered to the load is substantially instantaneously reduced.

18 Claims, 3 Drawing Sheets

INSTANTANEOUS FAILURE COMPENSATION CIRCUIT

BACKGROUND OF THE INVENTION

Field of the Invention

The present invention is directed to controllers and more particularly to compensation circuits which react to load changes.

There are a wide variety of controllers used to supply power to various types of loads. Controllers used to supply power to multiple lamps may include constant current or constant voltage types of controllers. Problems are encountered, however, when one lamp of a parallel connected group of lamps fails. The decrease in voltage drop across the line when a lamp fails increases the voltage across the remaining lamps. A constant voltage source, because it is incapable of recognizing that one of the lamps has failed, continues to supply the same voltage to the line plus the lamp load resulting in a decreased voltage drop across the line resistance and an increased voltage across the lamp load. This may cause a premature failure of the remaining lamps.

A constant current source suffers from an even greater problem. When a lamp of a parallel connected group of lamps fails, the current drawn by the lamp group decreases. The constant current source, sensing a drop in current, increases its output voltage to maintain a constant current output. In that situation, the remaining lamps must dissipate the additional power resulting from the increase in the voltage output from the controller.

One attempt at providing a failure compensation circuit is disclosed in U.S. patent application Ser. No. 33,543, filed herewith and which is assigned to the same assignee as the present invention. Disclosed in that application is a failure compensation circuit which uses a current transformer to provide an input signal representative of the current delivered to the load. Whenever a portion of the load drops out, the current drawn by the remaining load decreases. An average value of the new current is used to automatically reduce the voltage delivered by a power supply. Because an average value of the input signal is used to modify the voltage delivered by the power supply, it takes a predetermined period of time, for example, five cycles, before the power supply actually reduces the voltage supplied to the lamps.

Experiments have shown that when a lamp fails, arcing (a plasma discharge within the lamp) may occur which causes a current spike. It is also known that as lamps age, their sensitivity to over-voltage increases. Aged lamp failures often occur too quickly to be prevented by the failure compensation circuit discussed above.

Illustrated in FIG. 1 is a current versus time graph of the current drawn by a parallel connected group of lamps. The first spike was generated by a lamp which failed after 780 hours of use. That spiked triggered the failure of three other lamps which had 780, 780, and 0 hours of use. The subsequent failures occurred within five 60 Hz AC cycles of the first current spike.

Thus, there is a need for a lamp controller capable of recognizing when a lamp of a parallel connected group of lamps has failed for substantially instantaneously reducing the power output to the remaining lamps to prevent their failure.

SUMMARY OF THE PRESENT INVENTION

The present invention is directed to a compensation circuit for substantially instantaneously reducing the output voltage of a power supply in response to a current spike. The present invention is comprised of a circuit for monitoring the current delivered to a load for producing a switching signal whenever a current spike is detected. A control signal representative of the desired voltage across the load is generated. A power supply supplies voltage to the load in response to the control signal. The circuit for generating the control signal is responsive to the switching signal for adjusting the control signal such that when a current spike is detected, the voltage delivered to the load is substantially instantaneously reduced.

According to one embodiment of the present invention, first and second control signals are produced. The first control signal is representative of a desired voltage across the load while the second control signal is representative of a minimum voltage across the load. The switching signal causes the power supply to be responsive to the second control signal whenever a current spike is detected such that the power delivered to the load is substantially instantaneously reduced.

According to another embodiment of the present invention, after a predetermined period, measured from the detection of a current spike, control is gradually returned to the first control signal from the second control signal by a soft return circuit.

In certain environments, such as surgical environments, it is desirable to have the lamps fail at start up rather than during a surgical procedure. Therefore, according to another embodiment of the present invention, whenever the compensation circuit of the present invention is initially turned on, a soft start circuit provides a minimum level of power to the load to warm-up the load. After the load has been warmed up, a diagnostic circuit causes maximum power to be delivered to the load so that weak or defective lamps can be caused to burn out substantially at start up. These and other advantages and benefits of the present invention will become apparent from the following description of a preferred embodiment.

BRIEF DESCRIPTION OF THE DRAWINGS

In order that the present invention may be clearly understood and readily practiced, a preferred embodiment will now be described by way of example only, with reference to the accompanying figures wherein.

DESCRIPTION OF A PREFERRED EMBODIMENT

System Overview

Figure 1:
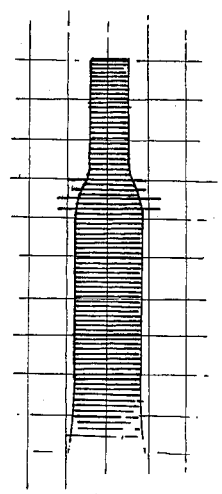
FIG. 1 is a graph illustrating the current drawn by a multiple lamp load, and showing four current spikes caused by four lamp failures.
Figure 2:
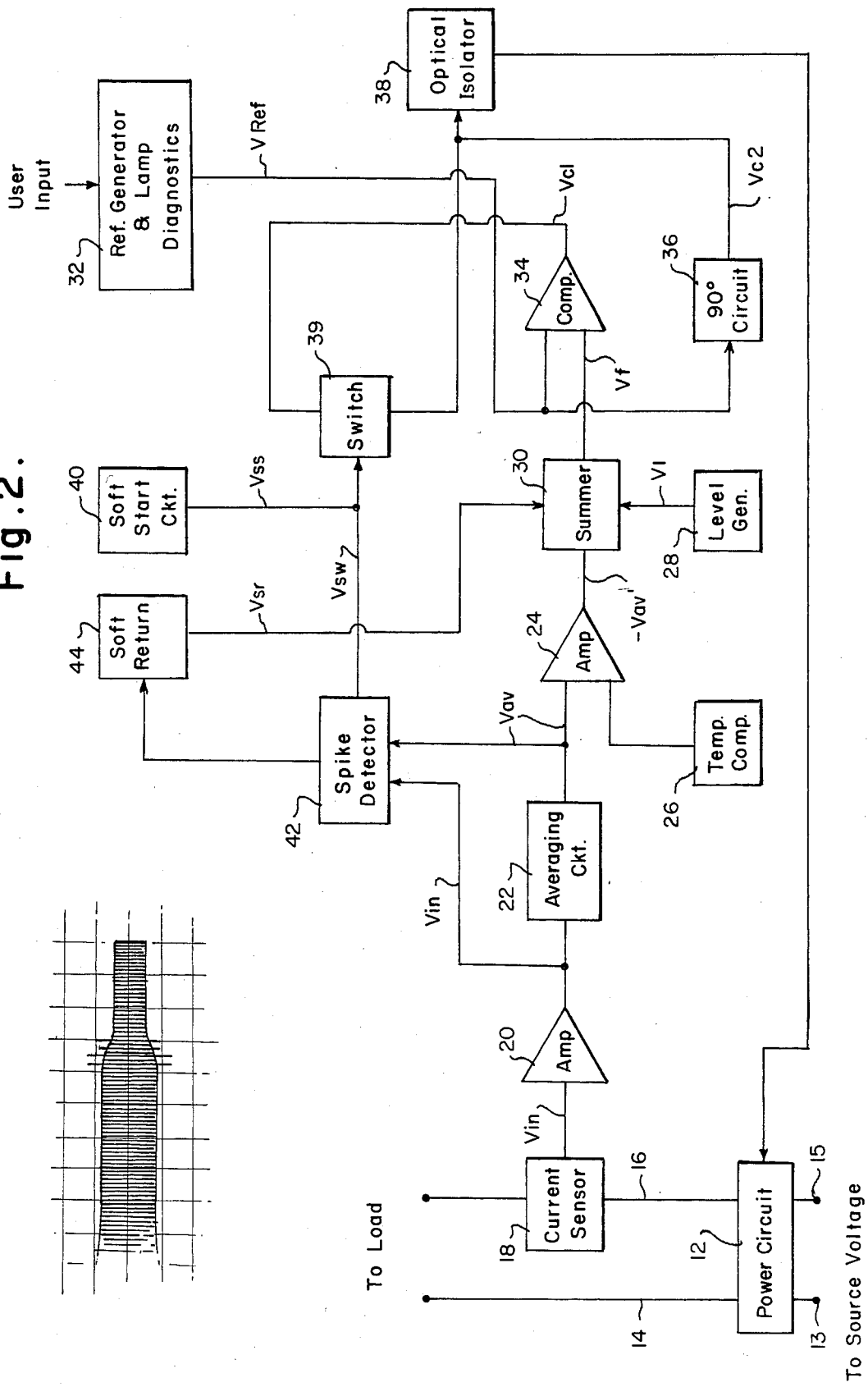
FIG. 2 is a block diagram illustrating an instantaneous failure compensation circuit constructed according to the teachings of the present invention.

FIG. 2 illustrates a failure compensation circuit 10 constructed according to the teachings of the present invention. The failure compensation circuit will be described in the context of a controller for a parallel connected group of lamps. However, the reader should appreciate that the teachings of the present invention are equally applicable to other types of power sensitive loads.

In FIG. 2, a power circuit 12, connectable at input terminals 13 and 15 to a source voltage (not shown), delivers power to a load (not shown) through a pair of conductors 14 and 16. A current sensor 18 is responsive to the current flowing through conductor 16.

The current sensor 18 produces an input signal $V_{in}$, proportional to the load current, which is amplified by an amplifier 20 and input to an averaging circuit 22. The averaging circuit 22 produces an average value signal $V_{av}$ which is the average value of the input signal $V_{in}$.

The average value signal $V_{av}$ is input to an amplifier 24 which inverts the average value signal $V_{av}$. It is known that the average value signal $V_{av}$ drifts due to temperature variations of the various components, particularly the current sensor 18. For that reason, a temperature compensation circuit 26 is provided which produces a signal that compensates for the drift in the average value signal $V_{av}$. The signal produced by the temperature compensation circuit 26 is input to the amplifier 24 such that the amplifier 24 produces an inverted, temperature compensated, average value signal $-V_{av}'$. The construction and operation of a suitable temperature compensation circuit 26 is disclosed in the above-identified U.S. patent application.

A level generator 28 produces a level signal $V_1$ which is combined with the temperature compensated average value signal $-V_{av}'$ in a summer 30 to produce a firing level signal $V_f$.

A reference generator and lamp diagnostic circuit 32 produces a reference signal $V_{ref}$ which is representative of the desired voltage across the load. The circuit 32 is responsive to user input such that the user can adjust the value of the referenced signal $V_{ref}$ and hence the desired voltage across the load.

The firing level signal $V_f$ and the reference signal $V_{ref}$ are compared in a comparator 34. In response to that comparison, the comparator 34 produces a first control signal $V_{cl}$ which is representative of the desired voltage across the load. The first control signal $V_{cl}$ is input to an optical isolator 38 through a switch 39. The manner in which the first control signal $V_{cl}$ is produced, and the use of the first control signal, are discussed in more detail hereinbelow in the section entitled "Production of the First Control Signal".

It is possible under certain circumstances that the comparison of the reference signal $V_{ref}$ and the firing level signal $V_f$ will not produce the first control signal $V_{cl}$. For that reason, a 90° circuit 36 is provided. The 90° circuit is responsive to the reference signal $V_{ref}$ and is constructed to guarantee the production of a second control signal $V_{c2}$. The second control signal insures that a certain minimal amount of power will be supplied to the load. The second control signal $V_{c2}$ is input to the optical isolator 38. The manner in which the second control signal $V_{c2}$ is produced and used is discussed in more detail hereinbelow in the section entitled "Production of the Second Control Signal".

The power circuit 12 is responsive to both the first and second control signals through the optical isolator 38. The second control signal is always generated but is only used by the power circuit in the event that the first control signal is not generated.

Upon start up, a soft start circuit 40 produces a soft start signal $V_{ss}$ which is input to the switch 39. The soft start signal $V_{ss}$ prevents the conduction of the first control signal $v_{cl}$ from the comparator 34 to the optical isolator 38. Thus, the power circuit 12 is responsive to the second control signal $V_{c2}$ during the time period during which the soft start signal $V_{ss}$ prevents the conduction of the first control signal $V_{cl}$. Because the second control signal $V_{c2}$ is representative of a minimum amount of power to be delivered to the load, the second control signal causes the load to be warmed up. After the load has warmed up, the soft start signal $V_{ss}$ is removed from the switch 39 such that control of the power circuit is returned to the first control signal $V_{cl}$.

In certain applications, such as surgical lamps, it is desirable to have lamps fail upon start up rather than at some later time when surgery may be in progress. For this reason, after the soft start signal $V_{ss}$ has allowed the load to properly warm-up, the circuit 32 produces a reference signal $V_{ref}$ having a maximum value. That causes the maximum amount of power to be supplied to the load. Lamps which are defective or near the end of their useful life should fail because of the amount of power being delivered to the lamps. After an appropriate time period, the reference signal $V_{ref}$ returns to the setting determined by the user. In this manner, weak or defective filaments can be caused to burn out upon turn on of the surgical light such that they may be replaced before surgery begins.

An important feature of the present invention is the spike detector 42. The spike detector 42 receives the instantaneous value of the input signal $V_{in}$ from amplifier 20 and the average value signal $V_{av}$ from the averaging circuit 22. The spike detector 42 compares those two signals to determine if a current spike is present on conductor 16. If a lamp failure current spike is detected, a switching signal $V_{sw}$ is produced which is input to the switch 39. The switching signal prevents the first control signal $V_{cl}$ from being conducted to the optical isolator 38. That has the effect of turning control over to the second control signal $V_{c2}$.

In a surgical lighting environment, the changeover of control from the first control signal $V_{cl}$ to the second control signal $V_{c2}$ may result in some decrease in the intensity of the lamps. However, that is preferable to the possibility of having one or more lamps fail due to overvoltage on the remaining lamps. The switching signal $V_{sw}$ lasts for a predetermined period of time. That predetermined period is sufficiently long to permit other portions of the circuit (i.e. current sensor 18, amp 20, averaging circuit 22, amp 24, and summer 30) to adjust the value of the first control signal $V_{cl}$ to compensate for the failed lamp before control is returned to the first control signal $V_{cl}$.

At the end of the predetermined time period during which the first control signal $V_{cl}$ is not conducted to optical isolator 38 (due to the presence of the switching signal $V_{sw}$) a soft return circuit 44 produces a soft return signal $V_{sr}$. The soft return signal $V_{sr}$ is input to the summer 30 and results in what is referred to as a gradual changeover from the second control signal $V_{c2}$ back to the first control signal $V_{cl}$.

Production of the First Control Signal $V_{cl}$

The power circuit 12 is comprised of a pair of silicon controlled rectifiers (not shown) connected in a back to back arrangement. The conduction time of the SCR's is controlled by the first or second control signals such that source voltage available at terminals 13 and 15 is delivered to the load. The first and second control signals advance or retard the SCR current conduction angles in a known manner such that the load RMS voltage is controlled. A detailed description of a suitable power circuit 12 is disclosed in the above-identified U.S. patent application, which is hereby incorporated by reference.

Figure 3A:
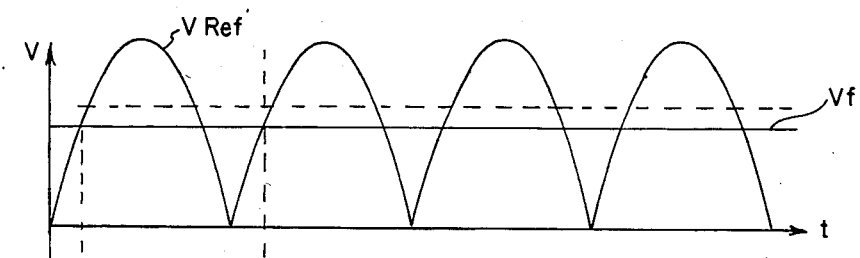
FIGS. 3A–3D illustrate various waveforms useful for understanding the present invention.

In FIG. 3A the reference signal $V_{ref}$ is illustrated. This signal $V_{ref}$ is in phase with the supply voltage available at input terminals 13 and 15. The supply voltage is shown in dotted lines in FIG. 3C. The reference signal $V_{ref}$ and the supply voltage available at terminals 13 and 15 may be produced, for example, by a multiple tap transformer.

Figure 3B:
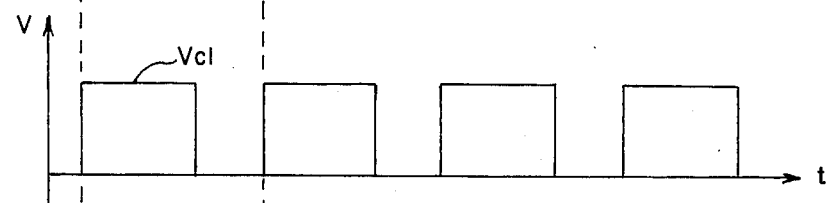
Figure 3C:
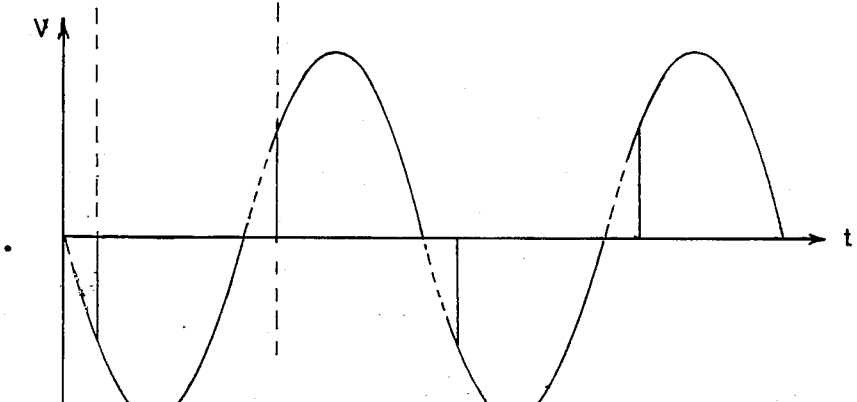

The reference signal $V_{ref}$ is compared by comparator 34 to the firing level signal $V_f$. The firing level signal $V_f$ is itself comprised of three components, the level signal $V_1$, the soft return signal $V_{sr}$, and th temperature compensated average signal $-V_{av}'$. Whenever the instantaneous value of the reference signal $V_{ref}$ equals the value of the firing level signal $V_f$, the first control signal $V_{c1}$ is produced as shown in FIG. 3B. The first control signal $V_{c1}$ causes one of the SCR's, whichever is properly biased, to become conductive and continue conducting power until the voltage waveform passes through zero as shown in FIG. 3C. Thus, the waveform shown in FIG. 3C is the voltage delivered to the load.

It will be apparent to the reader that because the reference signal $V_{ref}$ can be manipulated by the user, the voltage ultimately delivered to the load can be adjusted by the user. By increasing the magnitude of the reference signal $V_{ref}$, the reference signal more quickly equals the firing level signal $V_f$ such that more power is delivered to the load. By decreasing the value of the reference signal $V_{ref}$, it takes longer for the value of the reference signal $V_{ref}$ to equal the value of the firing level signal $V_f$ such that less power is delivered to the load. Those skilled in the art will recognize that this is a typical method of controlling the operation of silicon controlled rectifiers.

As previously stated, the voltage delivered to the load can be varied by the user by changing the magnitude of the reference signal $V_{ref}$. However, it should be apparent that the voltage delivered to the load can also be changed by changing the value of the firing level signal $V_f$. The firing level signal is comprised of three components, the first component being the level signal $V_1$ generated by the level generator 28. That component is fixed and does not change throughout the operation of the failure compensation circuit 10. The soft return signal $V_{sr}$ has a value of zero during normal operation. The last component of the firing lvel signal $V_f$ is the temperature compensated average signal $-V_{av}'$. During normal operation, that signal changes only when the user changes the magnitude of the reference signal $V_{ref}$. When the user increases the value of the reference signal $V_{ref}$, that causes an increase in the current delivered to the load. The increased current increases the value of the input signal $V_{in}$. Because the reference generator 32 is calibrated to compensate for the new firing level signal $V_f$, increased power is delivered to the load. The converse occurs whenever the user decreases the value of the reference signal $V_{ref}$ in order to decrease the power delivered to the load.

The major function of the temperature compensated average signal $-V_{av}'$ is to automatically reduce the voltage output by the power circuit 12 whenever a load drops out such as when a lamp failure occurs. Whenever there is a lamp failure, the current delivered to the load decreases. That decrease is sensed by the current sensor such that the value of the average value signal $V_{av}$ is reduced. This reduced signal is inverted, temperature compensated, and combined in summer 30 with the fixed level signal $V_1$ such that the firing level signal $V_f$ increases. That increase is shown in FIG. 3A by the dotted line. Of course, with the firing level signal $V_f$ increased, it takes longer for the instantaneous value of the reference signal $V_{ref}$ to equal the value of the firing level signal $V_f$ such that less voltage is delivered to the load. In this manner, the failure of a lamp, or dropping out of a load, causes the fire level signal $V_f$ to increase such that less voltage is automatically delivered to the load. That reduced voltage prevents the remaining lamps from failing prematurely.

However, it takes time, for example, five cycles, to produce the average signal $V_{av}$. Because a current spike is generated when a lamp fails (before the average value signal $V_{av}$ is produced and the circuit 10 has a chance to adjust to the reduced load), the spike detector 42, discussed above, has been provided.

The soft return circuit 44 is responsive to the spike detector 42 output. The soft return circuit 44 produces the soft return signal $V_{sr}$ which is added to the level signal $V_1$ and the temperature compensated average signal $-V_{av}'$ to produce the firing level signal. The soft return signal $V_{sr}$ is only added by summer 30 after a spike has been detected, and it is time to return control from the second control signal $V_{c2}$ back to the first control signal $V_{c1}$. Because the soft return signal $V_{sr}$ has a positive value, its addition by summer 30 causes the magnitude of the firing level signal $V_f$ to increase. However, the soft return signal $V_{sr}$ has a magnitude which decreases to zero over time such that the firing level signal $V_f$ slowly returns to the value determined by the level signal $V_1$ and the temperature compensated average signal $-V_{av}'$. In this manner, control is slowly switched over from the second control signal $V_{c2}$ to the normal value of the first control signal $V_{c1}$.

Production of the Second Control Signal $V_{c2}$

Figure 3D:
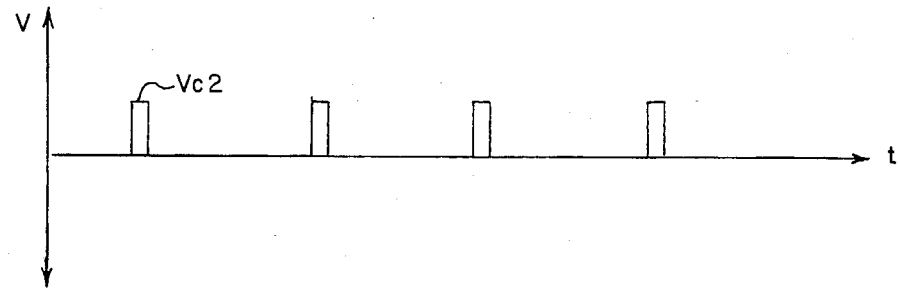

The 90° circuit 36 is responsive to the reference signal $V_{ref}$ to produce a second firing level signal which is representative of the peak value of the reference signal $V_{ref}$. The second firing level signal is compared to the instantaneous value of the reference signal $V_{ref}$. Whenever the two signals are equal, the second control signal $V_{c2}$ is produced as shown in FIG. 3D. A suitable 90° circuit 36 is disclosed in the aforementioned U.S. patent application.

Under normal operating conditions, by the time the second control signal $V_{c2}$ is produced, the first control signal $V_{c1}$ will have been produced such that one of the SCR's of the power circuit 12 will be conductive. Under those circumstances, the second control signal is not needed. However, under extraordinary circumstances it is possible that the instantaneous value of the reference signal $V_{ref}$ never equals the value of the firing level signal $V_f$ such that the first control signal $V_{c1}$ is not produced. When that occurs, the power circuit 12 then becomes responsive to the second control signal $V_{c2}$. The second control signal assures that once each cycle, each SCR will fire. That results in the conduction of a minimum amount of power to the load and prevents the power circuit 12 from becoming unstable and operating in a half-wave mode. The 90° circuit is so named because the second control signal is always produced whenever the reference signal $V_{ref}$ has a phase angle of substantially 90°.

The 90° circuit is also used for other purposes, i.e. for soft start, and immediately following the detection of a current spike. Those functions of the 90° circuit are discussed in more detail hereinbelow.

Soft Start Circuit 40, Reference Generator and Lamp Diagnostic Circuit 32

Figure 4:
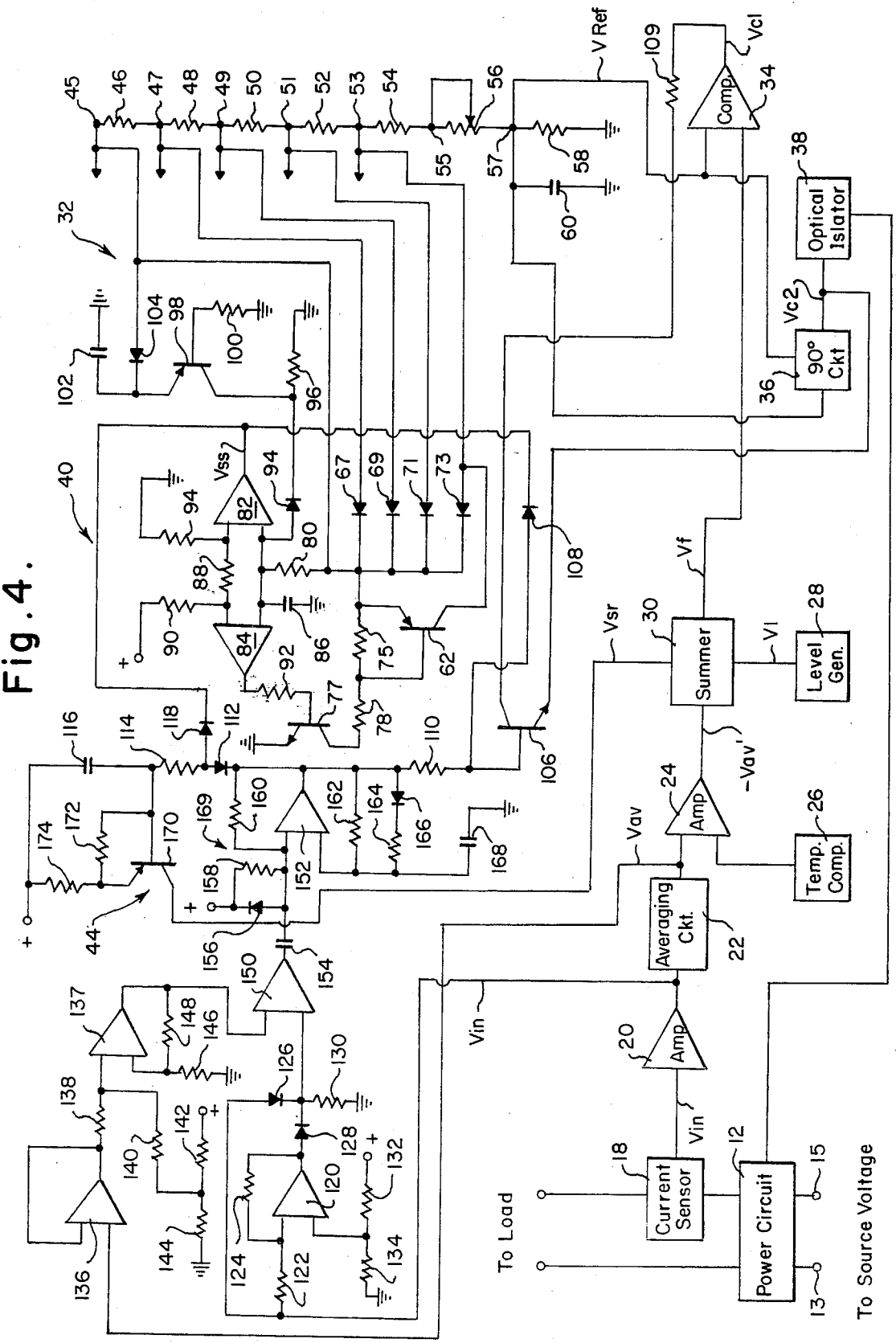
FIG. 4 is an electrical schematic of the instantaneous failure compensation circuit shown in FIG. 2.

An electrical schematic of the soft start circuit 40 and reference generator and lamp diagnostic circuit 32 is shown in FIG. 4. The comparator 34 receives at a noninverting input terminal the reference signal $V_{ref}$ which is produced by a string of resistors 46, 48, 50, 52, 54, and variable resistor 56 connected respectively across node pairs 45 and 47, 47 and 49, 49 and 51, 51 and 53, 53 and 55, and 55 and 57. The node 57 is connected to ground through the parallel combination of a resistor 58 and capacitor 60.

The resistors 46, 48, 50, 52, and 54 are responsive to user input such that they may be switched into or out of the resistive string. Clearly, by removing resistors from the resistive string the reference signal $V_{ref}$ is increased and by adding resistors to the resistive string the reference signal $V_{ref}$ is decreased.

The node 45 is connected to an emitter terminal of a transistor 62. The nodes 47, 49, 51, and 53 are each connected to the emitter of transistor 62 through diodes 67, 69, 71, and 73, respectively. The node 53 is also connected to a collector terminal of the transistor 62.

The emitter of the transistor 62 is connected to a base terminal thereof through a resistor 75. The base terminal of the transistor 62 is connected to a collector terminal of a transistor 77 through a resistor 78. An emitter terminal of the transistor 77 is connected to ground.

The emitter terminal of the transistor 62 is connected through a resistor 80 to a noninverting input terminal of an operational amplifier 82 and an inverting input terminal of an operational amplifier 84. The inverting input terminal of the operational amplifier 84 is connected to ground through a capacitor 86. A noninverting input terminal of the operational amplifier 84 is connected to an inverting input terminal of an operational amplifier 82 through a resistor 88. The noninverting input terminal of the operational amplifier 84 is connected to a positive voltage source through a resistor 90. An output terminal of the operational amplifier 84 is connected to a base terminal of the transistor 77 through a resistor 92.

The inverting input terminal of the operational amplifier 82 is connected to ground through a resistor 94. The noninverting input terminal of the operational amplifier 82 is connected to ground through the series combination of a diode 94 and a resistor 96.

The junction between the diode 94 and resistor 96 is connected to a collector terminal of a transistor 98. A base terminal of the transistor 98 is connected to ground through a resistor 100. An emitter terminal of the transistor 98 is connected to ground through a capacitor 102 and to node 45 through a diode 104.

An output terminal of the operational amplifier 82 is connected to a base terminal of a transistor 106 through a diode 108. A collector terminal of the transistor 106 receives the first control signal $V_{cl}$ from the comparator 34 through a resistor 109. An emitter terminal of the transistor 106 is connected to the optical isolator 38.

The base terminal of the transistor 106 is connected to a positive voltage source through the series combination of a resistor 110, diode 112, resistor 114, and capacitor 116. The junction between the diode 112 and resistor 114 is connected to the output terminal of the operational amplifier 82 through a diode 118.

In operation, the transistor 106 performs the function of the switch 39 shown in FIG. 2. Whenever voltage is available at the base terminal of the transistor 106, it is conductive such that the first control signal $V_{cl}$ can be input from the comparator 34 to the optical isolator 38. Whenever the voltage is removed from the base terminal of the transistor 106, the first control signal $V_{cl}$ is prevented from being conducted to the optical isolator 38.

The operational amplifier 82 is responsive to the voltage across the capacitor 86. When the compensation circuit 10 of the present invention is turned on, capacitor 86 begins to charge. As the capacitor 86 is charging, the output terminal of the operational amplifier 82 assumes a low state such that transistor 106 is turned off. With the transistor 106 turned off, the power circuit 12 is responsive to the second control signal $V_{c2}$. Because the second control signal $V_{c2}$ is representative of a minimum power to be delivered to the load, the load has an opportunity to warm-up. In the case of a lamp load, such a warm-up period is referred to as a soft start. Hence, the signal available at the output terminal of the operational amplifier 82 is the soft start signal $V_{ss}$ previously discussed. The duration of the soft start is determined by the time it takes for the capacitor 86 to charge to a first reference value determined by resistors 90, 88, and 94. When the capacitor 86 charges to that first reference value, the output of the operational amplifier 82 changes states thus rendering transistor 106 conductive and returning control of the power circuit to the first control signal $V_{cl}$.

While capacitor 86 is charging, the output available at the output terminal of the operational amplifier 84 is high. This high signal renders the transistors 77 and 62 conductive such that all of the resistors 46, 48, 50, 52, and 54 are taken out of the resistive string which causes the maximum value of the reference signal to be input at the noninverting input terminal of the comparator 34. That results in a first control signal $V_{cl}$ which is representative of the maximum amount of power. Until the capacitor 86 charges up to the first reference value, the first control signal is not conducted to the optical isolator 38. After the operational amplifier 82 renders transistor 106 conductive, the first control signal $V_{cl}$ representative of maximum power is then transmitted to the power circuit 12.

When the loads are lamps, lamps at the end of their life (which can operate at a low intensity setting) are expected to fail when exposed to the maximum power delivered by the power circuit 12. In surgical settings, this means that the lamps will fail at turn-on rather than during a surgical procedure. Thus, weak or defective lamps can be identified and replaced before surgical procedures begin.

When capacitor 86 charges up to a second reference value, determined by resistors 90, 88, and 94, the output of the operational amplifier 84 changes states to a low state. With the output of the operational amplifier 84 low, transistors 77 and 62 become nonconductive such that control of the production of the reference signal is returned to the resistive string. Thus, the intensity level selected by the user is now input to comparator 34.

It is anticipated that when the present invention is used to control lamps, the operational amplifier 82 may hold transistor 106 nonconductive for approximately four seconds thus allowing the lamps to warm-up. After four seconds, the capacitor 86 has charged to the first reference value and the operational amplifier 82 allows the transistor 106 to become conductive. However, because operational amplifier 84 is holding transistors 77 and 62 operative, all of the resistors in the resistive string are bypassed regardless of the setting chosen by the user such that a first control signal $V_{cl}$ representative of maximum power is produced. Maximum power may be delivered for approximately five seconds during which time lamps at the end of their life are expected to fail. At the end of that second time period, operational amplifier 84 turns off transistors 77 and 62 such that generation of the reference signal $V_{ref}$ is returned to the setting selected by the user.

Spike Detector 42 and Soft Return 44

The input signal $V_{in}$ is input to an inverting input terminal of an operational amplifier 120 through a resistor 122. The inverting input terminal of the operational amplifier 120 is connected to an output terminal thereof through a resistor 124. The input signal $V_{in}$ is connected to an output terminal of the operational amplifier 120 through a pair of diodes 126 and 128. The junction between the diodes 126 and 128 is connected to ground through a resistor 130. An inverting input terminal of the operational amplifier 120 receives a voltage produced by a voltage divider comprised of two resistors 132 and 134 connected between a positive voltage source and ground. The operational amplifier 120 and associated components provide a full wave rectification of the input signal $V_{in}$.

The average signal $V_{av}$ is input to a noninverting input terminal of an operational amplifier 136. An inverting input terminal of the operational amplifier 136 is connected to an output terminal thereof. The output terminal of the operational amplifier 136 is connected to a noninverting input terminal of an operational amplifier 137 through a resistor 138. The operational amplifier 137 is responsive, through a resistor 140, to a voltage produced by a voltage divider comprised of two resistors 142 and 144 connected between a source of positive voltage and ground. An inverting input terminal of the operational amplifier 137 is connected to ground through a resistor 146 and to an output terminal thereof through a resistor 148. The operational amplifier 136 comprises a voltage follower while the operational amplifier 137 and associated components operates as a level shifter.

An operational amplifier 150 has an inverting input terminal responsive to the output terminal of the operational amplifier 120 through the diode 128. The operational amplifier 150 has a noninverting input terminal responsive to the output terminal of the operational amplifier 137. The operational amplifier 150 compares the full wave rectified input signal $V_{in}$ to a level shifted average signal $V_{av}$. The signal available at the output of the operational amplifier 150 assumes a low state whenever a spike is present on the full wave rectified input signal $V_{in}$.

The output terminal of the operational amplifier 150 is connected to a noninverting input terminal of an operational amplifier 152 through a coupling capacitor 154. The noninverting input terminal of the operational amplifier 152 is connected to a positive voltage source through the parallel combination of a diode 156 and a resistor 158. The noninverting input terminal of the operational amplifier 152 is connected to an output terminal thereof through a resistor 160. An inverting input terminal of the operational amplifier 152 is connected to the output terminal thereof through a resistor 162 connected in parallel with the series combination of a resistor 164 and a diode 166. The inverting input terminal is also connected to ground through a capacitor 168. The output terminal of the operational amplifer 152 is connected to the base terminal of the transistor 106 through the resistor 110.

In operation, the operational amplifier 152 and associated components function as a one shot multivibrator generally designated 169. The output of the operational amplifier 152 assumes a low state whenever it receives a signal from the operational amplifier 150. With the output signal of the operational amplifier 152 low, the transistor 106 is rendered nonconductive. In this manner, control of the power circuit 12 is turned over to the 90° circuit 36 for a predetermined period of time beginning from the detection of a current spike caused by a portion of the load dropping out. Control may be turned over to the second control signal $V_{c2}$ within approximately one half cycle, or substantially instantaneously. By the time the time period of the one shot 169 has timed out, the averaging circuit 22 has produced a new value for the average signal $V_{av}$ which is representative of the lower current required by the load. Thus, when control is returned to the first control signal $V_{cl}$, the compensation circuit of the present invention has adjusted the power delivered by the power circuit 12 so as not to cause premature failure of the remaining loads.

The present invention is provided with a soft return circuit 44 such that upon the timing out of the one shot 169, control is not immediately returned to the first control signal $V_{cl}$. The soft return circuit 44 is comprised of a transistor 170 having a base terminal connected between the resistor 114 and capacitor 116. The base terminal of the transistor 170 is connected to an emitter terminal thereof through a resistor 172. The emitter terminal is connected to a positive voltage source through a resistor 174. A collector terminal of the transistor 170 is connected to the summer 30.

In operation, after the one shot 169 has timed out, the capacitor 116 begins to discharge through the transistor 170. That discharge voltage, which generates the soft return signal $V_{sr}$, is added by summer 30 to the level signal $V_1$ and the temperature compensated, inverted average signal $-V_{av}'$. Immediately upon the timing out of the one shot 169, the voltage across the capacitor 116 is greatest such that the magnitude of the firing level signal $V_f$ is substantially increased. However, as time goes on and the voltage across capacitor 116 decreases, the voltage added by summer 30 is correspondingly decreased thus allowing the level of the firing level signal $V_f$ to eventually return to the level determined by the level signal $V_1$ and the inverted average signal $-V_{av}'$. In this manner, control is returned to the first control signal $V_{cl}$ in a gradual manner. This reduces the amount of shock the loads might be subjected to if control were immediately returned to the first control signal $V_{cl}$.

The time period of the one shot multivibrator 169 may be approximately one-half second. This provides sufficient time for the averaging circuit 22 to produce a new value for the average value signal $V_{av}$. The time during which control is gradually returned to the first control signal $V_{cl}$ is determined by the maximum voltage across the capacitor 116 and the value of the resistor 174.

Conclusion

The present invention is directed to a compensation circuit for substantially instantaneously reducing the output voltage of a power supply in response to a current spike. That is accomplished by producing a second control signal which is representative of a minimum power to be delivered to the load. Upon the detection of a current spike, control is substantially instantaneously turned over to the second control signal such that the power delivered to the load is reduced to a minimum. After the compensation circuit of the present invention has had an opportunity to adjust to the reduced current required by the load, control can be gradually returned to the first control signal. The gradual return of control to the first control signal is controlled by a soft return signal.

Other features of the present invention provide for a soft start when the lamp is initially turned on followed by a period of maximum power being delivered to the load for diagnostic purposes.

While the present invention has been described in connection with an exemplary embodiment thereof, it will be understood that many modifications and variations will be readily apparent to those of ordinary skill in the art. This disclosure on the following claims are intended to cover all such modifications and variations.

What we claim is:

1. A compensation circuit for substantially instantaneously reducing the output voltage of a power supply in response to a current spike, said compensation circuit comprising:
   means for monitoring the current delivered to a load for producing a switching signal whenever a current spike is detected;
   means for providing a first control signal representative of the desired voltage across the load and a second control signal representative of a minimum voltage across the load; and
   power supply means for supplying voltage to the load in response to said control signals,
   said means for providing being responsive to said switching signal for providing said second control signal when a current spike is detected such that said voltage delivered to the load is substantially instantaneously reduced.

2. A compensation circuit for substantially instantaneously reducing the output voltage of a power supply in response to a current spike, said compensation circuit comprising:
   means for monitoring the current delivered to a load, including input means for generating a first input signal representative of the instantaneous value of the current and a second input signal representative of the average value of the current, and means for comparing said first and second input signals for producing a switching signal whenever a current spike is detected;
   means for generating a control signal representative of the desired voltage across a load; and
   power supply means for supplying voltage to the load in response to said control signal,
   said means for generating a control signal being responsive to said switching signal for adjusting said control signal such that when a current spike is detected said voltage delivered to the load is substantially instantaneously reduced.

3. The compensation circuit of claim 1 additionally comprising switch means for receiving said first control signal and for selectively transmitting same to said power supply means in response to said switching signal.

4. The compensation circuit of claim 3 additionally comprising means for generating a soft start signal, said switch means for selectively transmitting said first control signal in response to said soft start signal.

5. The compensation circuit of claim 3 wherein said means for providing said first control signal includes means for generating a firing level signal, means for generating a reference signal representative of the desired voltage across a load, and means for comparing said firing level signal and said reference signal and for generating said first control signal in response to said comparison.

6. The compensation circuit of claim 5 wherein said means for generating a reference signal automatically increases said reference signal for a predetermined period of time to apply maximum voltage across the load for diagnostic purposes.

7. The compensation circuit of claim 5 wherein said switch means prevents the transmission of said first control signal for a predetermined period of time after the detection of a current spike.

8. The compensation circuit of claim 7 additionally comprising means for generating a soft return signal and means for combining said soft return signal and said firing level signal such that at the end of said predetermined period of time, said voltage supplied by said power supply means is gradually increased from said minimum voltage up to said desired voltage.

9. A compensation circuit for substantially instantaneously reducing the output voltage of a power supply in response to a current spike generated by a lamp failure, said compensation circuit comprising:
   means for monitoring the current delivered to the lamps, including input means for generating a first input signal representative of the instantaneous value of the current and a second input signal representative of the average value of the current, and means for comparing said first and second input signals for producing a switching signal whenever a current spike caused by a lamp failure is detected;
   means for generating a first control signal representative of a desired lamp intensity;
   means for generating a second control signal representative of a minimum lamp intensity;
   switch means for receiving said first control signal and for selectively transmitting same in response to said switching signal; and
   power supply means responsive to said switch means and said second control signal for supplying voltage in accordance with said first control signal when no current spike is detected and in accordance with said second control signal when a current spike is detected.

10. The compensation circuit of claim 9 wherein the means for generating a first control signal includes means for generating a reference signal, means for generating a firing level signal, and a first comparator for comparing said reference signal to said firing level signal for generating said first control signal.

11. The compensation circuit of claim 10 additionally comprising a second comparator and a capacitor, said second comparator for comparing the voltage across said capacitor to a first reference value and for producing a soft start signal, said switch means selectively transmitting said first control signal in response to said soft start signal.

12. The compensation circuit of claim 11 additionally comprising a third comparator for comparing said voltage across said capacitor to a second reference value and for producing a diagnostic signal for automatically increasing the value of said reference signal for a predetermined period of time to apply maximum voltage across the lamps for diagnostic purposes.

13. The compensation circuit of claim 12 wherein said capacitor charges when the lamps are turned on, and wherein said first and second reference values are selected such that said soft start signal is produced for a first predetermined period of time beginning when the lamps are turned on, and said diagnostic signal is produced for a second predetermined period of time beginning after said first predetermined period of time.

14. The compensation circuit of claim 10 wherein said means for monitoring includes a one shot multivibrator responsive to said means for comparing for producing said switching signal, said switching signal having a predetermined duration.

15. The compensation circuit of claim 14 wherein said switch means prevents the transmission of said first control signal for said predetermined duration of said switching signal.

16. The compensation circuit of claim 15 additionally comprising means for generating a soft return signal and means for combining said soft return signal and said firing level signal such that at the end of said predetermined duration said voltage supplied by said power supply means is gradually increased from said minimum voltage up to said desired voltage.

17. The compensation circuit of claim 16 additionally comprising a capacitor and wherein said soft return signal includes a signal produced by the discharging of said capacitor.

18. The failure compensation circuit of claim 9 wherein the current delivered to the lamps includes alternating current, and wherein said switching signal is produced within approximately one-half cycle after the occurrence of a current spike.

* * * * *

UNITED STATES PATENT AND TRADEMARK OFFICE
CERTIFICATE OF CORRECTION

PATENT NO. : 4,785,390

DATED : November 15, 1988

INVENTOR(S) : Francis J. Zelina and Thomas E. Olon

It is certified that error appears in the above-identified patent and that said Letters Patent is hereby corrected as shown below:

Col. 4, line 4, delete "Vcl" and substitute therefor --$V_{cl}$--.

Col. 5, line 20, delete "th temperature" and substitute therefor --the temperature--.

Col. 5, line 54, delete "lvel" and substitute therefor --level--.

Col. 6, line 48, delete "representat1ve" and substitute therefor --representative--.

Signed and Sealed this

Twenty-second Day of August, 1989

*Attest:*

DONALD J. QUIGG

*Attesting Officer*     Commissioner of Patents and Trademarks